United States Patent
Urry

[11] Patent Number: 6,150,052
[45] Date of Patent: Nov. 21, 2000

[54] ELECTRODE FOR AN ELECTROCHEMICAL CELL INCLUDING STACKED DISKS

[75] Inventor: Lewis F. Urry, Elyria, Ohio

[73] Assignee: Eveready Battery Company, Inc., St. Louis, Mo.

[21] Appl. No.: 09/174,689

[22] Filed: Oct. 19, 1998

[51] Int. Cl.⁷ .................................................. H01M 4/00
[52] U.S. Cl. .................... 429/128; 429/223; 429/224; 429/229; 429/231.8; 429/231.95; 429/164; 429/165; 429/166; 29/623.1
[58] Field of Search .................. 429/128, 223, 429/224, 229, 231.8, 231.95, 164, 165, 166; 29/623.1

[56] References Cited

U.S. PATENT DOCUMENTS

| | | |
|---|---|---|
| 3,853,625 | 12/1974 | Louzos . |
| 3,957,532 | 5/1976 | Settle et al. .......................... 429/231.95 |
| 4,158,084 | 6/1979 | Prentice .................................... 429/112 |
| 4,347,293 | 8/1982 | Goebel et al. .......................... 429/128 |
| 4,403,020 | 9/1983 | Dampier .................................... 429/91 |

FOREIGN PATENT DOCUMENTS

| | | |
|---|---|---|
| 7254406 | 10/1995 | Japan . |
| 9216978 | 10/1992 | WIPO . |
| 9820569 | 5/1998 | WIPO . |

*Primary Examiner*—Laura Weiner
*Attorney, Agent, or Firm*—Robert W. Welsh; Stewart A. Fraser

[57] ABSTRACT

An electrode is disclosed that includes a plurality of stacked disks. The electrode is preferably a negative electrode of an alkaline cell and the disks are preferably formed of zinc. By forming the negative electrode of such zinc disks, the discharge capacity of the negative electrode is increased. Consequently, the high-rate service of an alkaline cell having the inventive negative electrode is improved.

24 Claims, 1 Drawing Sheet

ELECTRODE FOR AN ELECTROCHEMICAL CELL INCLUDING STACKED DISKS

BACKGROUND OF THE INVENTION

The present invention generally relates to an electrochemical cell. More particularly, the present invention relates to an improved electrode structure for an electrochemical cell, particularly for an alkaline cell.

Typical alkaline electrochemical cells include a positive electrode made of manganese dioxide ($MnO_2$), a negative electrode made of zinc, and an alkaline electrolyte made of potassium hydroxide (KOH), or the like. The positive electrode is normally formed as a hollow cylinder with its outer surface contacting the inner surface of a cell housing shaped as a can. A separator is disposed within the inside of the positive electrode to physically separate the positive electrode from the negative electrode while allowing ionic transport between the two electrodes.

The negative electrode is formed by mixing the zinc active material in the form of a zinc alloy powder with the alkaline electrolyte and a gelling agent. The mix is dispensed within the hollow middle area defined by the inner surface of the separator within the positive electrode. Subsequently, a collector assembly is inserted into the open end of the cell housing with a collector nail extending down within the negative electrode/electrolyte gel. An outer cover is then placed over the collector assembly and the cell housing walls are then crimped over the outer cover to seal the cell.

Japanese published Application No. 7-254406 discloses the use of a gelled zinc negative electrode in which a gelling agent and an alkaline electrolyte are mixed, and the negative electrode active material comprises non-amalgamated zinc powder in the shape of balls and long slender elements to increase the surface area exposed to alkali electrolyte.

In the manufacture and use of these known batteries or cells, the lowest zinc volume percent in the negative electrode that manufacturers utilize is about no less than 28 percent in the negative electrode gel in order to both match the positive electrode's rate of electrochemical output and provide sufficient particle-to-particle and particle-to-collector contact to maintain the negative electrode's electrical conductance. Below this amount, voltage instability occurs, as well as the resulting production of a cell structure having high sensitivity to shock and vibration, which cause the zinc particles to migrate away from the current collector nail thereby decreasing cell efficiency.

In order to provide the maximum electrochemical activity and a minimum of limiting polarization, it is desirable to operate a battery at as low a current density on the zinc as possible while still producing the required amount of total current from the system. Accordingly, alkaline batteries conventionally employ electrodes made from powdered active materials to obtain the highest possible surface area per unit weight or volume, and thus minimize the current density.

Conventional zinc powder is powder that has been produced by air-jet atomization of molten zinc. It consists of irregularly shaped particles, ranging from lumpy or distorted spheroids to elongated, tuberous forms. In typical battery grade zinc powder, the full population of material consists of many individual particles of a wide range of sizes and shapes. The median value of the particle size for negative electrodes, as determined by sieving, is approximately 100 to 300 microns. The extremes of particle sizes range from 20 to 1000 microns.

While zinc powder negative electrodes are relatively efficient at low discharge rates, such electrodes are much less efficient when discharged at high rates. Given that most new battery-powdered devices have high current demands, causing the batteries to discharge at high rates, there exists a strong demand for batteries having greater high-rate performance.

In International PCT Patent Publication No. WO 98/20569, entitled ZINC ANODE FOR AN ELECTROCHEMICAL CELL, by Lewis F. Urry, published on May 14, 1998, a negative electrode is disclosed that includes zinc flakes. The zinc flakes differ from the prior zinc powder particles in that the zinc flakes have a thickness many times smaller than both their length and width, for example, 10 to 20 times smaller. The disclosed flakes have a thickness on the order of 0.001 inch and lengths and widths of 0.024 to 0.04 inch. While the use of zinc flakes improves the high-rate performance of the negative electrode of an alkaline electrochemical cell, there remains room for further improving negative electrode performance particularly at high drain rates.

It has been discovered that discharge of zinc in an alkaline cell starts near the positive electrode and then proceeds away from the positive electrode. Because the reaction product (e.g., zinc oxide and zinc hydroxide) resulting from the discharge of zinc is more voluminous than the zinc itself, a reaction product skin tends to form between the positive and negative electrodes if there is not enough space to accommodate the reaction product. While such a skin still allows some electrolyte to pass through, the reacting zinc behind the skin does not receive hydroxyl ions from where they are formed in the positive electrode fast enough to offset those consumed by the reacting zinc. As a result, polarization occurs leading to premature cell failure.

In most cell designs, the current collector, which is often in the form of a nail, is located in the center of the negative electrode. Because most of the zinc discharge occurs at the outer periphery of the negative electrode near the positive electrode interface, it is necessary to maintain a continuous path of connected zinc from the reacting site to the collector nail to facilitate electron transfer. When zinc powders or flakes are used, many particles must touch to form an electron conduction path back to the collector nail. However, because the zinc powder or flakes only constitute approximately 30 percent of the negative electrode volume, any physical shocks to the cell may cause the particles to shift and lose contact. Thus, excess zinc is often added to the negative electrode only to serve as an electron conductor. The excess zinc, however, is not discharged during the life of the cell and takes up valuable space within the cell that could otherwise be used for extra electrolyte to fuel reactions or to hold discharge reaction product while still leaving space for ion transfer. Alternatively, some of the space could be used to increase the amount of $MnO_2$ in the positive electrode.

SUMMARY OF THE INVENTION

Accordingly, it is an aspect of the present invention to solve the above problems by providing a zinc negative electrode for an alkaline cell having improved high-rate performance. More specifically, it is an aspect of the present invention to provide a zinc negative electrode having improved electron conduction between the collector nail and the-peripheral reaction sites in the negative electrode. An additional aspect of the present invention is to provide a zinc negative electrode in which the zinc is more concentrated in the periphery of the negative electrode where it is more likely to discharge. Correspondingly, it is also an aspect of the present invention to provide an alkaline electrochemical cell including the improved zinc negative electrode.

To achieve these and other aspects and advantages, the electrochemical cell of the present invention comprises a negative electrode including a plurality of stacked zinc disks, a positive electrode disposed about the periphery of the zinc disks, and an electrolyte.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

Figure 1:
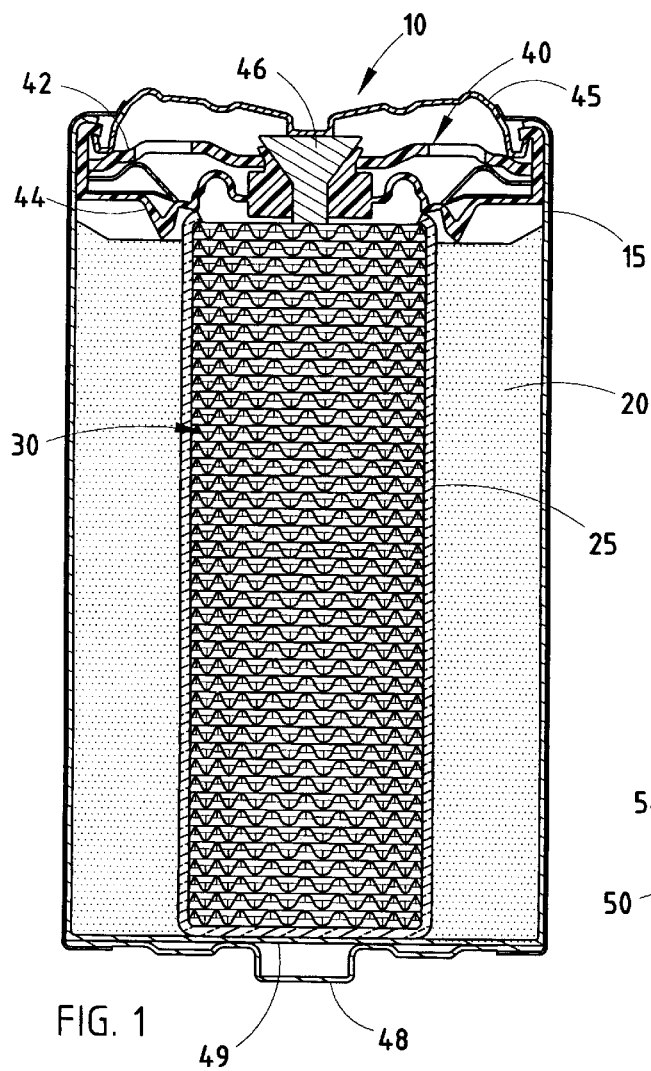
FIG. 1 is a cut-away schematic of an electrochemical cell constructed in accordance with a first embodiment of the present invention.

FIG. 1 shows an electrochemical cell 10 constructed in accordance with a first embodiment of the present invention. As shown, cell 10 includes a cylindrical cell housing 15 in which a positive electrode 20 is located adjacent the inner sidewalls of cell housing 15. Positive electrode 20 is shaped as a hollow cylinder that may be impact molded inside of housing 15 or inserted as a plurality of rings after molding. In a typical alkaline cell, positive electrode 20 is made primarily of $MnO_2$. Cell 10 further includes a separator 25 that lines the inner walls of the hollow cavity within positive electrode 20. As described in further detail below, a negative electrode 30 is deposited within the separator-lined hollow cavity of positive electrode 20. An alkaline electrolyte, such as KOH, is also dispensed within the lined hollow cavity of positive electrode 20.

The cell is closed and sealed by a collector assembly 40 and an outer terminal cover 45. In general, collector assembly 40 includes an inner cover 42, a seal 44, and a current collector 46. As known in the art, collector assembly 40 and outer terminal cover 45 are electrically coupled to negative electrode 30 and are insulated from the remainder of cell housing 15. In this manner, outer terminal cover 45 may serve as a negative contact terminal for cell 10. A second outer terminal cover 48 may be secured to a closed end 49 of the electrically conductive cell housing 15 to serve as a positive terminal for cell 10.

Figure 2:
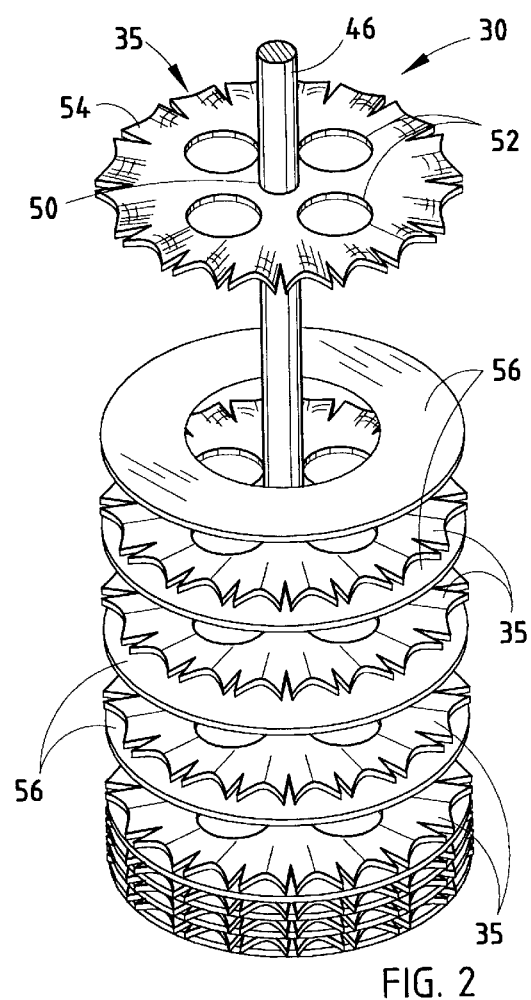
FIG. 2 is an exploded perspective view of a negative electrode constructed in accordance with the first embodiment of the present invention.

As shown in FIGS. 1 and 2, negative electrode 30 includes a plurality of stacked disks 35. For an alkaline cell, disks 35 are preferably made of zinc, and more preferably made of a zinc alloy including one or more of the metals selected from the group consisting of bismuth, indium, calcium, and aluminum. Disks 35 have a diameter that is approximately equal to the inner diameter of the layer of separator 25 that lines the hollow cavity of positive electrode 20. A central aperture 50 is formed in each of disks 35 that has a diameter substantially equal to that of current collector 46. In this manner, a plurality of such disks 35 may be threaded onto current collector 46 with interference fit so as to be in physical and electrical contact with current collector 46.

Disks 35 further include a plurality of apertures 52 that may be aligned in the stacked assembly. By providing apertures 52, electrolyte more readily flows axially within the cell, and hence may be dispensed in the cell without creating any unwanted air pockets. Also, apertures 52 facilitate transfer of hydrogen gas formed on the zinc by corrosion out of the negative electrode volume upward to the void space underlying the seal where it is consumed by the $MnO_2$ in the positive electrode. Accordingly, by increasing the amount of hydrogen gas consumed by the positive electrode, internal pressure buildup within the cell is reduced thereby enabling simpler seal designs to be used.

While the central portion of disks 35 is generally flat, the peripheral portion is preferably corrugated in order to increase the surface area of the negative electrode in the vicinity of the electrode interface. By maximizing the zinc surface area in the vicinity of the separator interface and by maintaining an excellent conductive path between the zinc disks and current collector 46, the discharge capacity of the negative electrode improves. The increased discharge efficiency of the zinc negative electrode of the present invention results in an electrochemical cell having improved high rate service, which is becoming increasingly important as more and more battery-powered devices are designed that draw current at higher rates. A prototype including a plurality of zinc disks was constructed and found to be capable of being subjected to a 2.5 A current load without becoming polarized.

As best shown in FIG. 2, negative electrode 30 further includes a plurality of washers 56 alternatingly disposed between disks 35. Washers 56 are provided to prevent adjacent disks from nesting with one another. If adjacent disks are allowed to nest, the zinc would either not be evenly distributed throughout the negative electrode or the zinc density would become excessive relative to the density of $MnO_2$ in the positive electrode. Further, by maintaining void space between adjacent disks, the surface area is further increased near the electrode interface and electrolyte flows more freely across the entire surface of the disks. Washers 56 may themselves be formed of zinc or may be formed of any inert material, such as a separator material. By making washers 56 of a separator material, the washers can absorb electrolyte and will not hamper the transport of ions and water within negative electrode 30.

By forming the negative electrode of a plurality of spaced-apart disks arranged perpendicular to the surface of the positive electrode inner surface, the electron conduction path between the periphery of the negative electrode and the current collector is greatly improved. Moreover, the zinc disks provide a conduction path that is stable and not subject to physical shock. The spacing of the disks provides chutes for the reaction product formed at the electrode interface to easily travel and expand toward the central void area provided by apertures 52. Thus, the reaction product skin found in most conventional cells is much less likely to form between the electrodes and inhibit transfer of hydroxyl ions from the positive electrode to the zinc in the negative electrode.

In addition, by introducing the zinc as disks, the distribution and location of the zinc may be more closely controlled. The disks also eliminate problems associated with zinc particles migrating through the separator or otherwise becoming located on the wrong side of the separator and in contact with the positive electrode. Because the distribution of zinc may be calculated and controlled, low volume percentage zinc may be used and variability in zinc weight per cell is very low. In addition, the grams of zinc per amp-hour designed into the cell may be reduced.

The negative electrode of the present invention may be easily assembled in mass production. The disks may be readily molded or stamped and then alternatingly fed onto a long collector pin along with the washers to form a plurality of negative electrodes resembling a sausage link. The disks are preferably between 2 and 20 mils thick and are more preferably between 5 and 10 mils thick, and have a radius approximately equal to the internal radius of the separator-lined cavity defined within the positive electrode. The plurality of linked negative electrode assemblies may be separated by a spacer washer fed onto the collector pin at periodic intervals. The negative electrode assemblies may then be cut apart and readily inserted into the separator lined hollow cavity defined by the positive electrode. Given the nature of the negative electrode construction, gelling of the electrolyte may be delayed until air is displaced in the cell by the dispensing of the electrolyte into the cell. In this manner, the gelling agent may be dispensed into the cell separate from the electrolyte so that the electrolyte may be dispensed gel-free. Because such a gel-free electrolyte is much less viscous, air is less likely to become trapped within the negative electrode during manufacture.

While a specific disk construction is shown and described, it will be appreciated by those skilled in the art that the number, sizes, and shapes of apertures 52 may be varied to optimize performance for different cell constructions. Also, the disks may have non-uniform thickness, such that the disks are thinner in their central regions in order to distribute more of the zinc to the periphery of the negative electrode. In addition, the depth and frequency of the corrugation may also be varied without departing from the scope of the present invention.

While the present invention has been described a negative electrode, it is possible that the electrode having the stacked disks could be the positive electrode. Additionally, although the present invention is described as a primary alkaline cell, the inventive electrode structure could be utilized in other primary cell chemistries, such as carbon-zinc or lithium cells, or in rechargeable cells, such as nickel cadmium, nickel metal hydride, or Li-ion cells. Thus, the disks could be made of any of the electrochemically active materials used for the positive or negative electrodes in such cells. For example, the disks could be made of a compound including at least one material selected from the group consisting of cadmium, nickel, metal hydride, lithium, cobalt, manganese dioxide, zinc, and carbon.

Although the present invention has been shown and described with reference to cylindrical cells, it will be appreciated by those skilled in the art that the zinc negative electrode of the present invention may be employed in other electrochemical cells, such as prismatic cells. Additionally, the negative electrode of the present invention may be used in cells having essentially any cell construction.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An electrochemical cell comprising:
   a first electrode including a plurality of stacked disks;
   a second electrode disposed about the periphery of said disks;
   an electrolyte;
   a cylindrical cell housing; and
   a current collector extending along a longitudinal central axis of said cell housing,
   wherein said disks have a radius sufficient to extend between said second electrode and said current collector, and wherein said disks include a central aperture having a radius approximately equal to the radius of said current collector.

2. The electrochemical cell as defined in claim 1, wherein said disks include a plurality of apertures.

3. The electrochemical cell as defined in claim 1, wherein said electrolyte is an alkaline electrolyte.

4. The electrochemical cell as defined in claim 1, wherein said second electrode is a positive electrode.

5. An electrochemical cell comprising a first electrode including a plurality of stacked disks, a second electrode disposed about the periphery of said disks, and an electrolyte, wherein said second electrode is a positive electrode including $MnO_2$.

6. The electochemical cell as defined in claim 1, wherein said disks are disposed perpendicular to an inner surface of said second electrode.

7. The electrochemical cell as defined in claim 1, wherein said disks are made of a compound containing a material selected from the group consisting of cadmium, nickel, metal hydride, lithium, cobalt, manganese dioxide, zinc, and carbon.

8. An electrochemical cell comprising a first electrode including a plurality of stacked disks, a second electrode disposed about the periphery of said disks, and an electrolyte, wherein said disks have a thickness between about 2 and 20 mils.

9. The electrochemical cell as defined in claim 8, wherein said disks have a thickness between about 5 and 10 mils.

10. An electrochemical cell comprsing a first electrode including a plurality of stacked disks, a second electrode disposed about the periphery of said disks, and an electrolyte, wherein said disks have corrugated peripheral edges.

11. An electrochemical cell comprising a first electrode including a plurality of stacked disks, a second electrode disposed about the periphery of said disks, and an electrolyte, wherein said disks are made of a zinc compound.

12. The electrochemical cell as defined in claim 11, wherein said disks are made of a zinc alloy including at least one of the metals selected from the group consisting of bismuth, indium, calcium, and aluminum.

13. An electrochemical cell comprising a first electrode including a plurality of stacked disks, a second electrode disposed about the periphery of said disks, an electrolyte, and a plurality of washers interposed between said disks.

14. The electrochemical cell as defined in claim 13, wherein said washers are made of a separator material.

15. The electrochemical cell as defined in claim 13, wherein said washers are made of a zinc compound.

16. An alkaline electrochemical cell comprising:
   a cylindrical cell housing;
   a positive electrode disposed within said housing and having a central cavity;
   a separator lining said central cavity;
   an electrolyte within said central cavity;
   a current collector extending along a longitudinal central axis of said cell housing; and
   a negative electrode including a plurality of stacked spaced-apart zinc disks having a radius sufficient to extend between said separator and said current collector and disposed perpendicular to the inner surface of said cavity.

17. The electrochemical cell as defined in claim 16, wherein said disks include a central aperture having a radius approximately equal to the radius of said current collector.

18. The electrochemical cell as defined in claim 17, wherein said zinc disks have corrugated peripheral edges.

19. The electrochemical cell as defined in claim 18, wherein said zinc disks include a plurality of apertures.

20. The electrochemical cell as defined in claim 19 and further including a plurality of washers interposed between said disks.

21. The electrochemical cell as defined in claim 20, wherein said washers are made of separator material.

22. The electrochemical cell as defined in claim 20, wherein said washers are made of zinc.

23. The electrochemical cell as defined in claim 20, wherein said zinc disks have a thickness between about 2 and 20 mils.

24. The electrochemical cell as defined in claim 23, wherein said zinc disks have a thickness between about 5 and 10 mils.

* * * * *